US005660578A

United States Patent [19]

Clara

[11] Patent Number: 5,660,578
[45] Date of Patent: Aug. 26, 1997

[54] METHOD FOR DETERMINING THE LENS GRINDING ERROR AND CONTOUR FOLLOWER READING ERROR TO CALIBRATING A LENS TRIMMING MACHINE

[75] Inventor: Philippe Clara, Le Perreux, France

[73] Assignee: Essilor International Compagnie Generale d'Optique, Charenton le Pont, France

[21] Appl. No.: 382,186

[22] Filed: Feb. 1, 1995

[30] Foreign Application Priority Data

Mar. 15, 1994 [FR] France ................ 94 02971

[51] Int. Cl.$^6$ ................ B24B 49/00; B24B 51/00
[52] U.S. Cl. ................ 451/8; 451/41
[58] Field of Search ................ 451/9, 10, 237, 451/240, 239, 11, 41, 42, 43, 44, 8

[56] References Cited

U.S. PATENT DOCUMENTS

| | | | |
|---|---|---|---|
| 3,899,851 | 8/1975 | Asselin et al. | 451/240 |
| 4,493,168 | 1/1985 | Field, Jr. | 451/21 |
| 4,885,875 | 12/1989 | Soper | 451/240 |
| 4,912,880 | 4/1990 | Haddock et al. | 51/101 |
| 5,139,373 | 8/1992 | Logan et al. | 451/240 |
| 5,161,333 | 11/1992 | Lecerf et al. | 451/240 |
| 5,165,202 | 11/1992 | Spindel, Jr. | 451/240 |
| 5,231,587 | 7/1993 | Frost | 364/474.06 |
| 5,333,412 | 8/1994 | Matsuyama | 451/240 |
| 5,363,597 | 11/1994 | Gottschald et al. | 451/240 |

FOREIGN PATENT DOCUMENTS

| | | |
|---|---|---|
| 0092364 | 10/1983 | European Pat. Off. . |
| 0492740 | 7/1992 | European Pat. Off. . |
| 4012660 | 10/1991 | Germany . |

*Primary Examiner*—James G. Smith
*Assistant Examiner*—Derris H. Banks
*Attorney, Agent, or Firm*—Young & Thompson

[57] ABSTRACT

To determine the reproduction error of a trimming machine associated with a contour follower device, a first reading is taken on the contour follower device from a template of known shape. A part is then machined on the trimming machine in accordance with the first reading. A second reading is taken on the contour follower device using the machined part. The reproduction error is deduced from the two readings by calculation. The method can be applied to autocalibration of a system comprising a trimming machine and a contour follower device associated with each other by way of a numerical controller, in particular for machining an eyeglass lens.

3 Claims, No Drawings

METHOD FOR DETERMINING THE LENS GRINDING ERROR AND CONTOUR FOLLOWER READING ERROR TO CALIBRATING A LENS TRIMMING MACHINE

BACKGROUND OF THE INVENTION

1. Field of the Invention

The present invention is generally concerned with the trimming operation whereby an eyeglass lens is machined to match the contour of the rim or surround of the eyeglass frame in which it is to be mounted, independently of the finishing operation which usually follows on from the trimming operation and in which a bevel or a groove can be formed on the edge of the eyeglass frame, depending on how it is attached to the rim or surround of the frame.

2. Description of the Prior Art

The trimming operation is usually carried out on a trimming machine in which the cutting tools are grinding wheels or milling tools, for example; this machine is usually called a grinder or bevelling grinder.

The present invention is more particularly directed to the situation in which a trimming machine of this kind is associated with a contour follower device, more particularly still with the situation in which the system comprising the trimming machine and the contour follower device is under the control of a numerical controller.

As the corresponding arrangements are well known in themselves and do not of themselves constitute any part of the present invention they need not be described here.

Suffice to say that the contour follower device can read off the shape in terms of its magnitude and direction, i.e. orientation, either directly from the rim or surround of the eyeglass frame or indirectly from a template imaging the rim or surround of the eyeglass frame.

In either case the numerical controller then supplies the trimming machine with the data obtained in this way, in order for the trimming machine to reproduce it.

Naturally, after machining there must be as close as possible a fit between the contour of the eyeglass lens and that of the rim or surround of the eyeglass frame in which it is to be mounted.

The results of this machining are subject to two, successive types of error.

There is firstly the reading error due to the contour follower device.

Then there is the reproduction error due to the trimming machine.

The reading error of the contour follower device is for the most part due to its design and in practice is relatively constant.

However, the reproduction error of the trimming machine is essentially due to inevitable wearing down of the cutting tool, and so increases with time.

In both cases, however, these are systematic errors which are always operative in the same direction, rather than randomly, and it is therefore possible to allow for them by means of calibration operations.

Accordingly, at present the contour follower device is usually calibrated before use using a gauge whose known shape is compared with the measured shape. Likewise, at present the trimming machine is usually calibrated in its turn, also using a gauge which forms a template for machining a lens and whose known shape is compared with that of the machined lens.

In the case of the trimming machine, at present this calibration operation entails measuring the machined lens with callipers and must be systematically carried out after each sharpening of the cutting tool. Each time the operator must adjust accordingly the reproduction error to be allowed for in each machining operation.

A first object of the present invention is to provide a method which simplifies determination of the reproduction error.

SUMMARY OF THE INVENTION

The invention consists in a method for determining the reproduction error of a trimming machine associated with a contour follower device, said method consisting in taking a first reading on the contour follower device from a template of known shape, machining a part on said trimming machine in accordance with said first reading, taking a second reading on said contour follower device using the machined part, and deducing said reproduction error from said two readings by calculation.

In practise, the invention deduces the read error of the contour follower device from the first reading and, by eliminating this read error, it then deduces the required reproduction error from the second reading.

If $D_0$ denotes any dimension of the template used, $D_1$ denotes the value of this dimension as read off by the contour following device, and X denotes the read error of the latter device, then after the first reading:

$$D_1 = D_0 + X \qquad \text{(I)}$$

If $D_2$ denotes the value of the previous dimension after machining an eyeglass lens on the trimming machine and Y denotes the reproduction error of the latter machine, then after machining of the eyeglass lens:

$$D_2 = D_1 + Y \qquad \text{(II)}$$

Assuming, as is the case in practice, that the read error X is substantially constant, and if $D_3$ denotes the value of the dimension in question as read off by the contour follower device from the machined eyeglass lens, then after the second reading:

$$D_3 = D_2 + X \qquad \text{(III)}$$

Substituting equation II:

$$D_3 = D_1 + X + Y \qquad \text{(IV)}$$

The two equations I, IV in two unknowns give the read error X and the reproduction error Y as a function of the first reading $D_1$ and the second reading $D_3$.

Another object of the present invention is application of the above method to autocalibration of the system comprising a trimming machine associated with a contour follower device by a numerical controller.

This application entails having the numerical controller take note of the difference between two readings of the contour follower device obtained, in accordance with the above method, firstly from a template of known shape and secondly from a part machined on the trimming machine according to the data read off from this template.

In practise the readings allow not only for the dimensions of the template and of the machined part, but also their orientation.

The template used can be a circular disk, for example, or a disk with a flat parallel to its axis or a disk with a rectangular (for example: square) contour.

Readings are preferably taken for each type of finishing operation likely to be used, i.e. for finishing by forming a bevel or by forming a groove or finishing limited to polishing the edge of the eyeglass lens.

In all cases the results of these readings are systematically acquired by the numerical controller and, in accordance with a predetermined autocalibration program, the numerical controller allows for these results in its control of the trimming machine, correcting the instructions it sends to the latter according to the data received from the contour follower device.

The contour follower device is of the type described in patent FR-A-2 652 893 or in patent EP-A-0 291 378, for example, and the trimming machine can be that described in patent application FR-A-2 553 323.

Of course, the present invention encompasses any variant execution.

There is claimed:

1. A method for determining the lens grinding or reproduction error of a trimming machine of the kind comprising a trimming tool, a contour follower device for reading and recording the contour of a template for a desired spectacle rim and the complementary contour of a lens trimmed with the trimming tool in accordance with the template, wherein the invention comprises the steps of: (i) reading with the contour follower device the contour of a template for use in trimming a lens and recording the contour reading; (ii) trimming a lens in the trimming machine in accordance with the contour of the template; (iii) reading with the contour follower device the contour of the lens thus trimmed and recording the contour reading; (iv) comparing the template and trimmed lens contours to ascertain the lens grinding or reproduction error due to wear of the lens grinding tool.

2. The method according to claim 1, wherein the reading error of the contour follower device is determined from the reading of the contour of the template and the grinding tool error is derived from the reading of the contour of the trimmed lens after eliminating the reading error inherent in the contour follower.

3. A method for autocalibration of a numerically controlled lens trimming system comprising a lens trimming machine of the kind comprising a trimming tool, a contour follower device for reading the contour of a template for a desired spectacle rim and the complementary contour of a lens trimmed with the trimming tool in accordance with the template, and a numerical controller for controlling the lens trimming machine, wherein the invention comprises the steps of: (i) reading with the contour follower device the contour of a template for use in trimming a lens and recording the template contour reading; (ii) trimming a lens in the trimming machine in accordance with the template contour; (iii) reading with the contour follower device the contour of the lens thus trimmed and recording the contour reading in the numerical controller; (iv) comparing the recorded template and trimmed lens contours to ascertain the reading error the lens grinding error due to wear of the lens grinding tool.

* * * * *